United States Patent
Gebhard

[11] 3,793,671
[45] Feb. 26, 1974

[54] WINDSHIELD CLEANER ASSEMBLY

[75] Inventor: Harold C. Gebhard, Livonia, Mich.

[73] Assignee: Ford Motor Company, Dearborn, Mich.

[22] Filed: June 19, 1972

[21] Appl. No.: 264,118

[52] U.S. Cl............................. 15/250.01, 15/250.27
[51] Int. Cl............................. B60s 1/46, B60s 1/24
[58] Field of Search....... 15/250.01, 250.02, 250.03, 15/250.04, 250.22, 250.25, 250.26, 250.27, 250.29, 250.3; 74/78

[56] References Cited
UNITED STATES PATENTS

| | | |
|---|---|---|
| 2,329,895 | 9/1943 | Hansen....................... 15/250.27 X |
| 2,703,258 | 3/1955 | Neufeld....................... 15/250.01 X |
| 3,418,676 | 12/1968 | Byczkowski et al.............. 15/250.04 |
| 3,548,441 | 12/1970 | Kruger............................. 15/250.01 |
| 3,733,913 | 5/1973 | Schneider et al................ 15/250.27 |

*Primary Examiner*—Peter Feldman
*Attorney, Agent, or Firm*—John J. Roethel; Keith L. Zerschling

[57] ABSTRACT

A cowl mounted windshield washer and wiper system is preassembled as a unit. The assembly comprises an elongated casing horizontally divided into upper and lower half shells. Housed within the casing are a drive motor and wiper blade pivot shaft actuating means. The pivot shaft actuating means are located at each end of the casing and the motor intermediate the ends.

7 Claims, 2 Drawing Figures

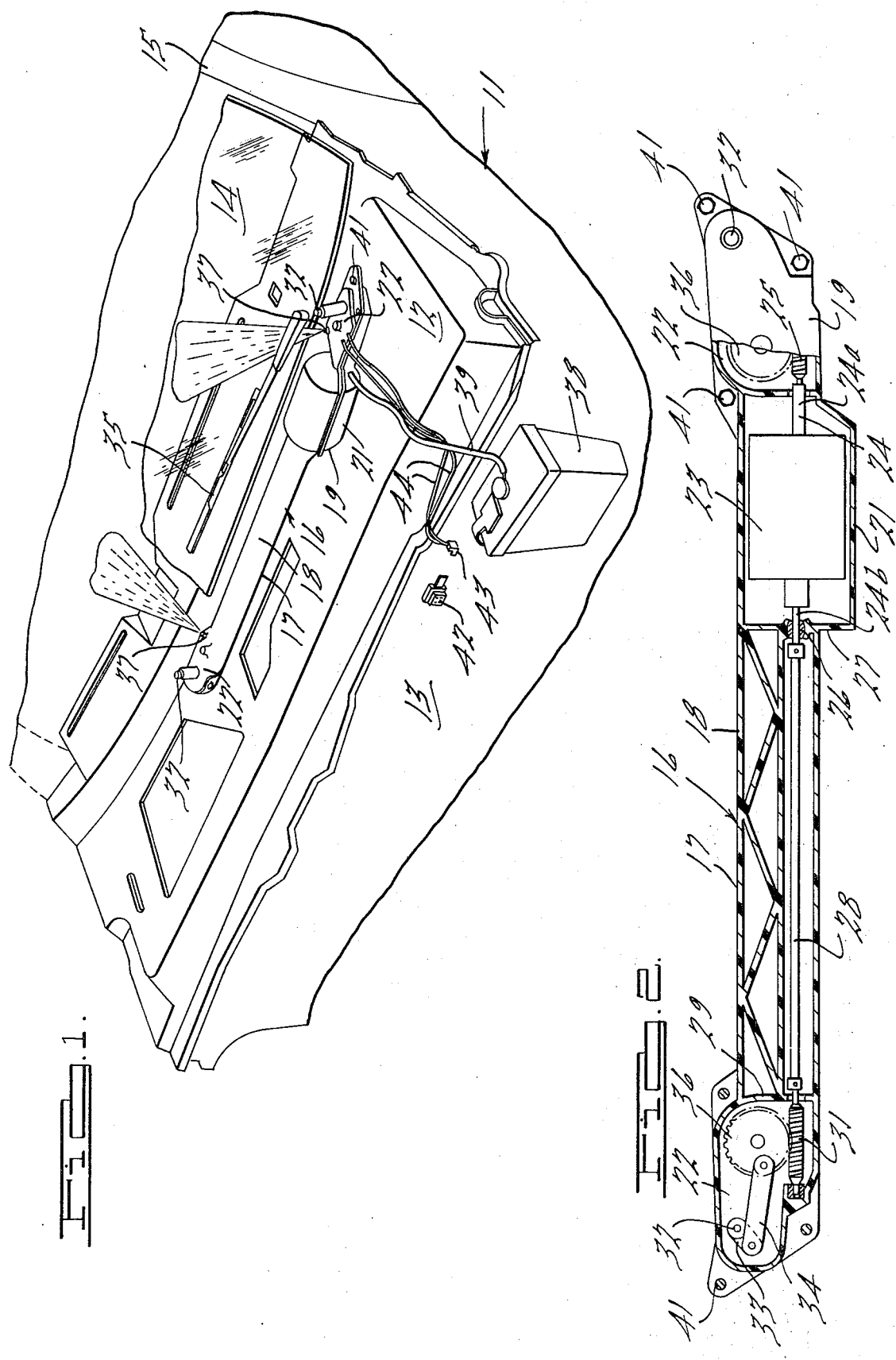

WINDSHIELD CLEANER ASSEMBLY

BACKGROUND OF THE INVENTION

The conventional windshield cleaner mechanism or system comprises a plurality of components such as a motor, wiper mounting shafts and drive links coupling the motor to the shafts. These components must be mounted on the vehicle cowl structure and this is frequently done in a piecemeal or semi-piecemeal manner. This presents alignment problems and from a time standpoint is an undesirable assembly operation.

It is an object of the present invention to provide a windshield wiper and washer system which may be installed on a vehicle cowl as a unitary structure.

SUMMARY OF THE INVENTION

The present invention relates to a cowl mounted windshield cleaner assembly comprising an elongated casing horizontally divided into upper and lower half shells. The lower half shells when assembled from a cylindrical chamber intermediate the ends of the casing and substantially box-like chambers at each end thereof. A drive motor is positioned in the cylindrical chamber and has a drive shaft projecting from each end thereof. Each end casing member supports therein windshield wiper blade oscillation means. A drive means contained within the casing and interposed between the motor and oscillation means drives the latter in wiper blade oscillation movements.

To provide for the distribution of windshield washer solvent on the windshield, fluid conduits which may be carried by one of the half shells are connected to nozzle outlets directed at the windshield. The fluid conduits are adapted to be connected to a source of windshield washer solvent.

DETAILED DESCRIPTION OF THE DRAWING

Further features and advantages of the present invention will be made more apparent as this description proceeds, reference being had to the accompanying drawing, wherein:

FIG. 1 is a fragmentary perspective view of a portion of a vehicle body with the windshield washer and wiper system embodying the present invention shown mounted thereon; and FIG. 2 is a horizontal section view on the center plane of the windshield washer and wiper system.

DETAILED DESCRIPTION OF THE INVENTION

With reference to the drawing, there is shown a fragmentary portion of a vehicle body, generally designated 11. Visible are the cowl structure 12, a portion of the dash panel 13 and a portion of the windshield 14 in its framing structure 15.

Adapted to be mounted on the cowl structure 12 is the windshield cleaner assembly, generally designated 16, embodying the present invention. The cleaner assembly 16 comprises an elongated casing 17 formed of two longitudinally extending substantially symmetrical half shells, an upper half shell 18 and a lower half shell 19. The half shells 18 and 19 have planar mating surfaces. Each half shell comprises a unitary member having an open semi-cylindrical chamber intermediate its ends and an open box-like chamber at each end. The semi-cylindrical chamber and the box-like chamber of each half shell is open to the planar mating surface of the respective half shell. The upper and lower half shells in assembled relationship have the several chambers aligned with each other to form a closed cylindrical chamber 21 intermediate the ends of the casing and closed substantially box-like chambers 22 at each end of the casing.

An electric drive motor 23 is positioned in the cylindrical chamber 21 and has a double ended shaft 24, each end projecting from an end of the chamber 21. The end 24a of the shaft projects directly into the right end chamber 22, as viewed in the drawing, and has coupled thereto a worm gear 25. The left end 24b of the shaft is supported on the bearing 26 carried in an end wall 27 of the chamber 21.

A shaft extension 28 extends to the left of the casing through an end wall 29 of the left box-like chamber 22. The shaft extension is coupled to a worm gear 31.

The axis of the motor shaft 24 and of the casing cylindrical chamber 22 substantially parallels the longitudinal axis of the casing 17.

Projecting upwardly from the respective end chambers 22 are windshield wiper support shafts 32. Within the chambers the shafts are coupled to a crank 33 in a drive link 34 for imparting oscillatory motion to a wiper arm 35. Only one of the wiper arms 35 is shown. For purposes of illustration it is shown in exploded relation to the shaft 32 at the right end of the casing. Each drive link 34 of the oscillatory motion means is coupled to a gear 36 in mesh with the worm, the worm 25 at the right end and the worm 31 at the left end of the casing.

The casing half shells 18 and 19 are preferably molded of plastic and may be provided with internal conduits or passageways (not shown) connected to nozzle outlets 37 positioned to spray washer solvent on the windshield. The washer solvent is piped to the casing conduits from a reservoir and pump unit 38 mounted within the engine compartment through a hose 39.

The washer and wiper assembly 16 is bolted to the top of the cowl by bolts 41. It will be readily apparent that the unit may be rapidly installed on the assembly line and may be rapidly removed for service, it only being necessary to connect or disconnect the electrical connections 42 and 43, the connection 43 being at the end of the lead wire 44 leading to the motor. The assembly 16 may be completely tested a precertified as to operativeness. It is then ready to be dropped into the vehicle with no alignment problems. In the event of service requirements, it may be removed and replaced by another unit while the one unit is being repaired and made available as a rebuilt unit for future resale and reuse.

It is to be understood that the invention is not limited to the exact construction illustrated and described above, but that various changes and modifications may be made without departing from the spirit and scope of the invention defined by the following claims:

I claim:

1. A cowl mounted windshield cleaner assembly comprising:

an elongated casing formed of two longitudinally extending, substantially symmetrical, integral half shells having planar mating surfaces, each half shell comprising a unitary member having an open semi-cylindrical chamber intermediate its ends and an open box-like chamber at each end, the semi-cylindrical chamber and the box-like chambers of each half shell being open to the planar mating surface of the respective half shell, the two half shells in assembled relationship having the several chambers aligned with each other to form a closed cylindrical chamber intermediate the ends of the casing and closed substantially box-like chambers at each end thereof, a drive motor positioned in the cylindrical chamber and having a drive shaft projecting from each end thereof and extending into the end box-like chamber, windshield wiper blade oscillation means supported in each box-like chamber, and drive means contained within each box-like chamber interposed between the motor and oscillation means to drive the latter in wiper blade oscillation movements.

2. A cowl mounted windshield cleaner assembly according to claim 1, in which:

the axis of the motor shaft and the cylindrical chamber containing the motor substantially parallels the longitudinal axis of the casing.

3. A cowl mounted windshield cleaner assembly according to claim 2, in which:

the casing half shells are of molded plastic, fluid conduits molded into one of the half shells are connected to nozzle outlets directed at the windshield, the fluid conduits are adapted to be connected to a source of windshield washer solvent.

4. A cowl mounted windshield cleaner assembly according to claim 3, in which:

each drive means comprises a worm gear connected to a respective end of the motor shaft in axial alignment therewith, gear means in mesh with the worm gear, a windshield wiper arm receiving shaft projecting upwardly from the casing end chambers, and oscillating link means coupling the gear means to the arm receiving shaft.

5. A cowl mounted windshield cleaner assembly according to claim 1, in which:

fluid conduits carried by one of the half shells are connected to nozzle outlets directed at the windshield, the fluid conduits are adapted to be connected to a source of windshield washer solvent.

6. A cowl mounted windshield cleaner assembly according to claim 5, in which:

each drive means comprises a worm gear connected to a respective end of the motor shaft in axial alignment therewith, gear means in mesh with the worm gear, a windshield wiper arm receiving shaft projecting upwardly from the casing end chambers, and oscillating link means coupling the gear means to the arm receiving shaft.

7. A cowl mounted windshield cleaner assembly according to claim 1, in which:

each drive means comprises a worm gear connected to a respective end of the motor shaft in axial alignment therewith, gear means in mesh with the worm gear, a windshield wiper arm receiving shaft projecting upwardly from the casing end chambers, and oscillating link means coupling the gear means to the arm receiving shaft.

* * * * *